United States Patent
Filoteo Razo et al.

(10) Patent No.: US 11,214,120 B2
(45) Date of Patent: Jan. 4, 2022

(54) DISTRIBUTED FIBER OPTIC SENSING SYSTEM

(71) Applicant: Continental Automotive Systems, Inc., Auburn Hills, MI (US)

(72) Inventors: Agustin Filoteo Razo, Tlajomulco de Zuñiga (MX); Abdiel Ortega Méndez, Tlajomulco de Zuñiga (MX); Omar Reyes Barón, Zapopan (MX); Karla Pedraza Ontiveros, Troy, MI (US); Humberto Diaz Escobar, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 236 days.

(21) Appl. No.: 16/179,169

(22) Filed: Nov. 2, 2018

(65) Prior Publication Data

US 2020/0139787 A1     May 7, 2020

(51) Int. Cl.
    *B60H 1/00*         (2006.01)
    *G01K 5/60*         (2006.01)
    *G02B 6/44*         (2006.01)
    *H04B 10/25*       (2013.01)

(52) U.S. Cl.
    CPC ........... *B60H 1/00792* (2013.01); *G01K 5/60* (2013.01); *G02B 6/4452* (2013.01); *H04B 10/25891* (2020.05)

(58) Field of Classification Search
    CPC .......... B60H 1/00792; H04B 10/25891; G01K 5/60; G01K 11/32; G01K 11/3206; G02B 6/4452
    See application file for complete search history.

(56) References Cited

U.S. PATENT DOCUMENTS

| | | | | | |
|---|---|---|---|---|---|
| 4,417,782 | A | * | 11/1983 | Clarke | G01K 3/00 250/577 |
| 5,264,914 | A | * | 11/1993 | Oho | G01C 19/72 356/460 |
| 5,473,428 | A | * | 12/1995 | Lee | G01K 11/3206 356/480 |
| 6,511,222 | B1 | * | 1/2003 | Bouamra | G01K 11/32 250/227.14 |
| 7,155,075 | B2 | * | 12/2006 | Rajendran | G01K 11/32 385/12 |
| 7,162,111 | B2 | | 1/2007 | Baur et al. | |

(Continued)

FOREIGN PATENT DOCUMENTS

| | | |
|---|---|---|
| WO | 9003040 | 3/1990 |
| WO | 9003040 A1 | 3/1990 |

*Primary Examiner* — Thomas A Hollweg
*Assistant Examiner* — Mary A El-Shammaa

(57) ABSTRACT

A disclosed vehicle sensing system includes an optic fiber disposed adjacent to a vehicle panel, a transmitter/receiver disposed at an originating end of the optic fiber, the transmitter/receiver configured to emit a beam through the optic fiber at a defined originating frequency, and a reflector disposed at a terminal end of the optic fiber for reflecting the beam back through the optic fiber to the transmitter/receiver. Dimensional changes to the optic fiber change the originating frequency reflected back to the transmitter/receiver and the change in the originating frequency is indicative of a physical change in the vehicle panel.

10 Claims, 3 Drawing Sheets

(56) References Cited

U.S. PATENT DOCUMENTS

| | | | | |
|---|---|---|---|---|
| 8,876,157 | B2* | 11/2014 | Nilsson | B60R 21/0134 |
| | | | | 280/735 |
| 9,553,465 | B2* | 1/2017 | Raghavan | H01M 10/48 |
| 9,738,253 | B2* | 8/2017 | Czyz | B60Q 1/2611 |
| 10,029,639 | B2* | 7/2018 | Kim | B60R 21/0136 |
| 10,208,586 | B2* | 2/2019 | Johnston | E21B 47/135 |
| 10,473,489 | B1* | 11/2019 | Potter | G01D 5/268 |
| 2007/0162231 | A1* | 7/2007 | Schlogl | B60R 21/0136 |
| | | | | 701/301 |
| 2009/0038386 | A1* | 2/2009 | Bavoux | G01L 23/22 |
| | | | | 73/114.18 |
| 2010/0225460 | A1* | 9/2010 | Watanabe | B60R 19/483 |
| | | | | 340/436 |
| 2010/0232739 | A1* | 9/2010 | Nowsch | G01D 5/3537 |
| | | | | 385/13 |
| 2013/0322490 | A1* | 12/2013 | Bell | G01D 5/35316 |
| | | | | 374/161 |
| 2014/0160885 | A1* | 6/2014 | Tenghamn | G01V 1/3817 |
| | | | | 367/16 |
| 2014/0203783 | A1* | 7/2014 | Kiesel | H02J 7/007 |
| | | | | 320/134 |
| 2015/0100000 | A1* | 4/2015 | Asaoka | A61B 1/00135 |
| | | | | 600/587 |
| 2015/0280290 | A1* | 10/2015 | Saha | H01M 10/486 |
| | | | | 429/50 |
| 2019/0019387 | A1* | 1/2019 | Birnkrant | A62C 31/00 |
| 2019/0257699 | A1* | 8/2019 | Handerek | G01K 11/32 |
| 2019/0320244 | A1* | 10/2019 | Albers | G01N 29/50 |
| 2020/0011995 | A1* | 1/2020 | Send | G01S 7/4817 |

\* cited by examiner

DISTRIBUTED FIBER OPTIC SENSING SYSTEM

TECHNICAL FIELD

The present disclosure relates to a system for measuring temperatures and strains on different locations of a motor vehicle.

BACKGROUND

Measurement and detection of temperatures and strains at different locations of a vehicle body are utilized to detect impact. Once an impact is detected, various vehicle safety systems are engaged. Detection of an impact is accomplished using individual sensors distributed throughout the vehicle. Each sensor requires individual wires and mounting arrangements that can complicate assembly and operation. Moreover, in many instances, each system includes dedicated sensors that may be duplicated by different systems.

Vehicle manufacturers are continually seeking ways of improving driver safety and comfort while maintaining and building customer satisfaction and interest.

SUMMARY

A vehicle sensing system according to an exemplary embodiment of this disclosure, among other possible things, includes an optic fiber disposed adjacent to a vehicle panel, a transmitter/receiver disposed at an originating end of the optic fiber, the transmitter/receiver configured to emit a beam through the optic fiber at a defined originating frequency, and a reflector disposed at a terminal end of the optic fiber for reflecting the beam back through the optic fiber to the transmitter/receiver, wherein dimensional changes to the optic fiber change the originating frequency reflected back to the transmitter/receiver and the change in the originating frequency is indicative of a physical change in the vehicle panel.

A further embodiment of the foregoing vehicle sensor system including a controller in communication with the transmitter/receiver and receiving information relating to the change in the originating frequency, wherein the controller is configured to identify the physical change in the vehicle panel responsive to the change in the originating frequency.

In a further embodiment of any of the foregoing vehicle sensor systems, the optic fiber expands and contracts responsive to temperature changes in the vehicle panel and expansion and contraction of the optic fiber causes changes in the originating frequency that are indicative of a temperature of the vehicle panel.

In a further embodiment of any of the foregoing vehicle sensor systems, distortion of the vehicle panel generates a corresponding distortion in the optic fiber that generates changes in the originating frequency.

In a further embodiment of any of the foregoing vehicle sensor systems, the changes in the originating frequency are utilized to determine a distance from the transmitter/receiver within optic fiber of the distortion in the optic fiber and thereby the location of the distortion in the vehicle panel.

In a further embodiment of any of the foregoing vehicle sensor systems, the distortion is a strain on the vehicle panel.

In a further embodiment of any of the foregoing vehicle sensor systems, the distortion at least partially interrupts the beam.

In a further embodiment of any of the foregoing vehicle sensor systems, the transmitter/receiver comprises a coherent optical frequency domain reflectometry.

In a further embodiment of any of the foregoing vehicle sensor systems, the optic fiber includes a sensing fiber arm and a reference fiber arm, the sensing fiber arm extending to the vehicle panel and the reference fiber arm enclosed within a contained environment.

In a further embodiment of any of the foregoing vehicle sensor systems, the fiber arm is continuous from the transmitter/receiver to the reflector.

In a further embodiment of any of the foregoing vehicle sensor systems, the optic fiber is disposed in a sensing pattern on the vehicle panel to sense distortions within different regions of the vehicle panel.

A method of measuring physical properties of a vehicle panel according to another example embodiment of this disclosure, among other possible things, includes the step of supporting an optic fiber on a vehicle panel such that distortion of the vehicle panel causes a corresponding distortion in the optic fiber, transmitting a beam of a defined frequency through the optic fiber with a transmitter/receiver, detecting changes in the defined frequency caused by distortion in the optic fiber, categorizing the distortion with a controller based on the detected changes in the defined frequency, and adjusting a vehicle operating parameter based on the category of the distortion.

In a further embodiment of the foregoing method, the beam is reflected at a terminal end of the optic fiber back through the optic fiber to the transmitter/receiver.

In a further embodiment of the foregoing methods, the controller is in communication with the transmitter/receiver and receives information relating to the change in the defined frequency and identifies the distortion in the vehicle panel responsive to the change in the defined frequency.

In a further embodiment of the foregoing methods, the optic fiber expands and contracts responsive to temperature changes in the vehicle panel and expansion and contraction of the optic fiber causes changes in the defined frequency that are indicative of a temperature of the vehicle panel.

In a further embodiment of the foregoing methods, the optic fiber expands and contracts responsive to temperature changes in the vehicle panel and expansion and contraction of the optic fiber causes changes in the defined frequency that are indicative of a temperature of the vehicle panel.

In a further embodiment of the foregoing methods, the optic fiber includes a sensing fiber arm and a reference fiber arm, the sensing fiber arm extending to the vehicle panel and the reference fiber arm enclosed within a contained environment and determining a change in the determined frequency includes a comparison of a frequency of the beam in the reference fiber arm and the sensing fiber arm.

In a further embodiment of the foregoing methods, the sensing fiber optic arm is supported in a sensing pattern on the vehicle panel to sense distortions within different regions of the vehicle panel.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
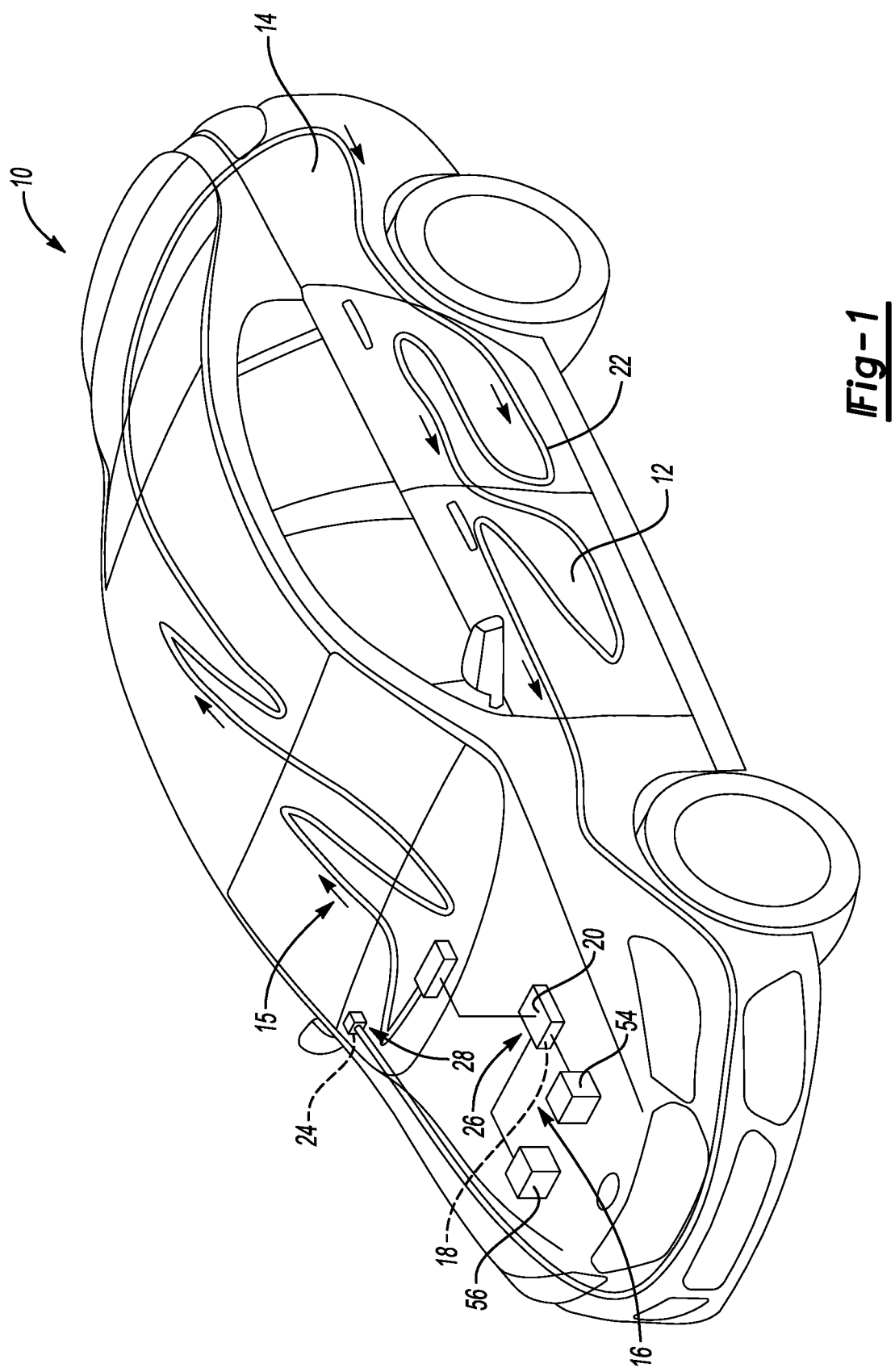
FIG. 1 is a schematic view of a vehicle including an example sensor system embodiment.

Referring to FIG. 1, an example vehicle 10 includes a body 12 defined by a plurality of panels 14. The vehicle includes systems 54, 56 that provide different functions within the vehicle during operation. One system 54 provides actuation of safety devices such as airbags and occupant restraint systems. Another system 56 provides for actuation of a vehicle braking system. Each of the systems 54, 56 are activated in response to a measured parameter that indicates that the vehicle is involved in a collision or other condition that warrants actuation of the safety system.

The example vehicle 10 includes a sensor system 16 that provides information indicative of temperature, physical changes and/or distortion to the vehicle body including the door 12 and panels 14. It should be appreciated that although the systems 54 and 56 are shown and described by way of example, other systems are also within the contemplation of this disclosure and would benefit from the information provided by the disclosed sensor system 16.

The sensor system 16 includes an optic fiber 22 that is coupled to a transmitter/receiver 18 at an originating end 26. The transmitter/receiver 18 emits a light beam at a defined frequency into the optic fiber 22. The light beam travels through the optic fiber 22 to a terminal end 28 and is reflected back toward the transmitter/receiver 18 by a reflector 24. The transmitter/receiver 18 receives the reflected light beam and detects changes from the defined frequency or amplitude.

The optic fiber 22 is assembled to the panels 14 such that any strain and/or distortion in the panels 14 are inflicted on the optic fiber 22. Accordingly, expansion and contraction of the panels 14 generate a corresponding expansion or contraction in the optic fiber 22. Expansion and contraction of the optic fiber 22 are examples of physical changes that occur that can alter the defined frequency. Examples of other physical changes in the optic fiber 22 include changes in length, diameter, distortion of the shape and/or any other dimensional change that change the optic fiber 22 in a manner that would alter the defined frequency. The physical changes to the optic fiber 22 can be caused by temperature fluctuations, stress, strain and damage from an external object. Moreover, damage to the optic fiber 22 such as being cut, crushed or otherwise physically degraded would also result in changes to the defined frequency. Additionally, although a single optic fiber 22 that extends about the entire vehicle is shown by way of example, several optic fibers 22 could be utilized to extend to different parts of the vehicle and are within the scope and contemplation of this disclosure.

Figure 2:
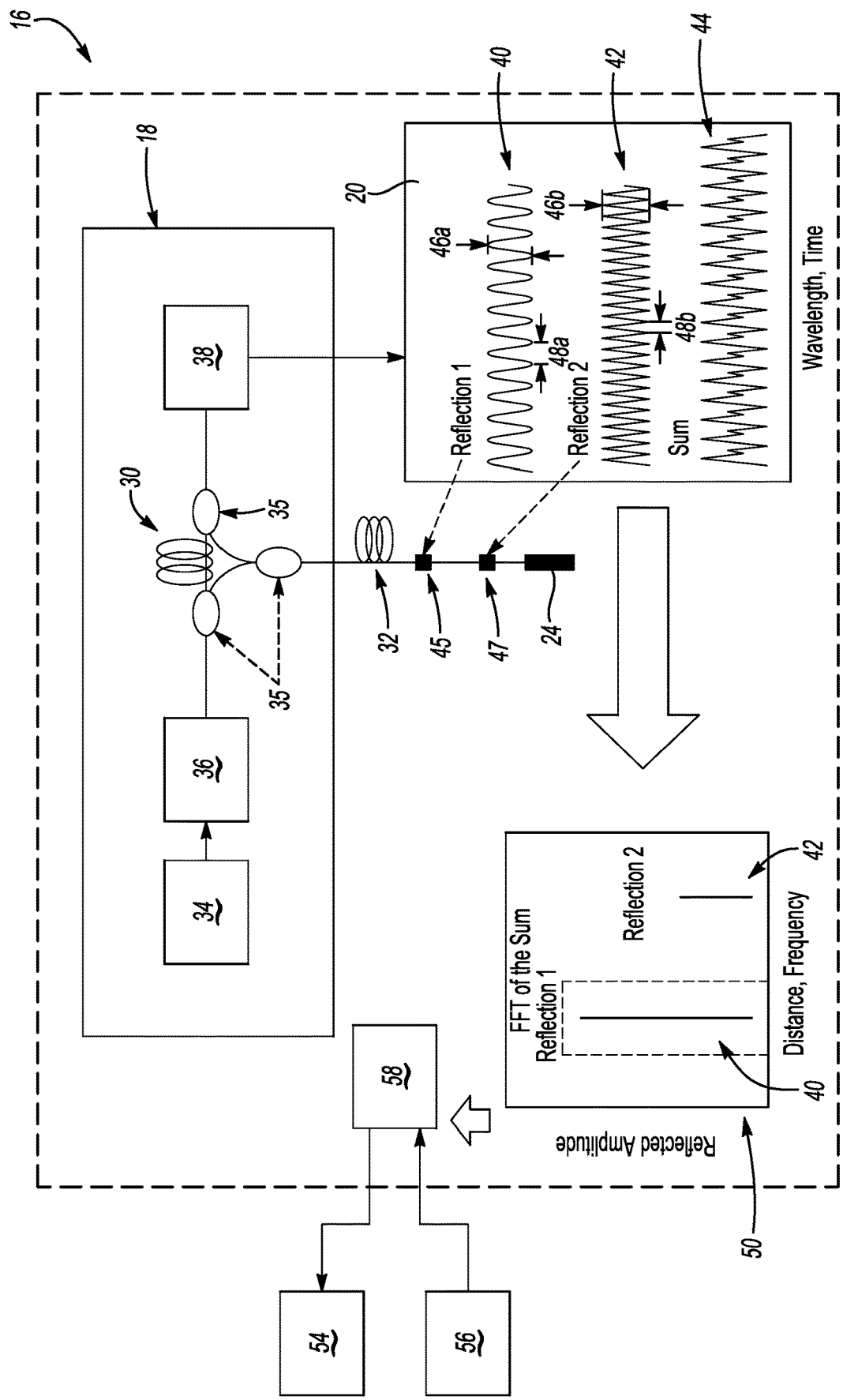
FIG. 2 is a schematic view of the example sensor system embodiment.

Referring to FIG. 2 with continued reference to FIG. 1, the example sensor system 16 is schematically shown and includes the transmitter/receiver 18 that is coupled to a controller 20. The controller 20 is coupled to a vehicle bus 58 that communicates with other vehicle systems, shown schematically at 54 and 56. In this example, the transmitter/receiver 18 comprises a Coherent Optical Frequency Domain Reflectometry (C-OFDR). The C-OFDR 18 includes a modulator 34 and a beam generator 36. The modulator 34 provides an output to define a frequency of a beam provided by the beam generator 36. In the example embodiment, the beam generator 36 generates a laser beam that is transmitted into the optic fiber 22. The transmitter/receiver 18 further includes a photodetector 38 that receives the reflected back beam and communicates information regarding the reflected back beam to the controller 20.

In this example, the optic fiber 22 includes a reference optic fiber arm 30 and a sensing optic fiber arm 32. The sensing optic fiber arm 32 is the optic fiber that is routed throughout the vehicle 10 and is assembled to and supported on each of the panels 14. The reference optic fiber arm 30 is enclosed within a contained environment such that physical changes to the vehicle body 12 and panels 14 do not alter the shape or length of the reference optic fiber arm 30. Accordingly, the defined frequency provided in the reference optic fiber arm 30 does not change due to distortions.

The controller 20 uses the information received from the photodetector 38 to determine and identify changes in the defined frequency that is originally transmitted into the optic fiber 22. The difference between an expected characteristics of the beam 15 and the actual characteristics of the beam 15 is utilized to determine the type, location and severity of distortion and/or damage to the vehicle body 12 and panels 14.

Differences and changes in the beam 15 may be detected in the form of differing amplitudes and/or different frequencies. As appreciated, the beam 15 is transmitted into the optic fiber 22 at a defined frequency and amplitude. The shape and length of the optic fiber 22 will result in a resultant frequency and amplitude that is predictable and known. Changes to the shape and length of the optic fiber due to panel distortion, temperature changes or other condition that physically alters the optic fiber will change the characteristics of the beam 15. The magnitude and character of changes to the beam 15 are indicative of the location and severity of damage. Changes in the beam 15 can be detected in any way understood by those knowledgeable in the art and are all within the contemplation of this disclosure.

In the disclosed example embodiment, light scattered back from the reflector 24 through the sensing optic fiber arm 32 interferes with light from the reference optic fiber arm 30 at output couplers 35. Varying the frequency of the beam 15 wavelength generates periodic signal at the photodetector 38. The frequency of the periodic signal is dependent on the location at which the beam 15 is reflected back through the sensing fiber optic arm 32. When light from the beam 15 is scattered back from the reflector 24, an expected periodic signal with an expected frequency and amplitude is received. When a break or other distortion is encountered, the periodic signal generates a different frequency and amplitude. In this disclosed example, the further from the beam generator 36 that the distortion is located, the greater the periodic frequency of the reflected or interference light from the beam 15.

In this example, a first wave form 40 with a first frequency 48a and a first amplitude 46a are communicated to the controller 20. The first wave form 40 is that part of the beam 15 that is reflected back due to a first distortion 45. A second waveform 42 includes a second frequency 48b and a second amplitude 46b. The second waveform 42 results from reflections caused by a second distortion 47. As appreciated, because both the first and second waveforms 40, 42 are received at the same time, they are originally received as a combined waveform indicated at 44. The combined waveform 44 is split into separate waveforms with separate frequency and amplitude components utilizing known techniques and processes. In one disclosed example, a fast Fourier transform signal processing technique is utilized to separate signals that correspond to the different distortions 45, 47. The amplitudes shown at 50 provide an indication of the distance from the beam generator 36 and thereby the position along the optic fiber 22.

Figure 3:
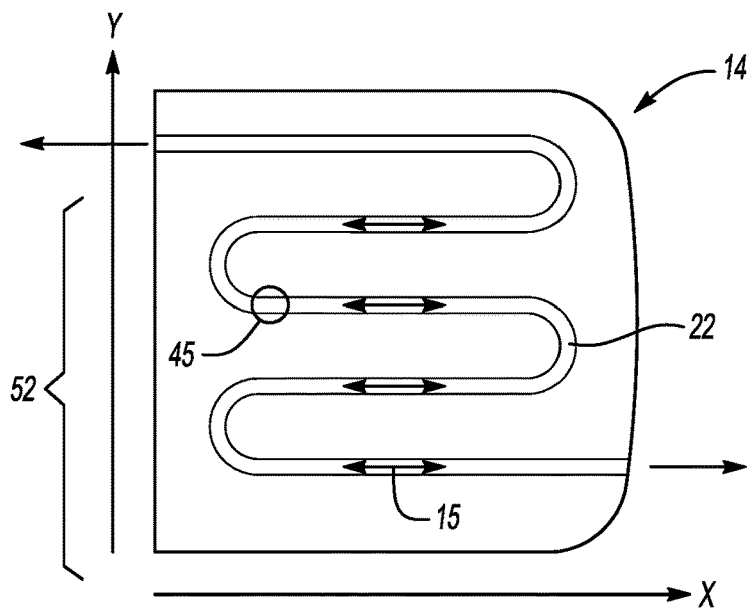
FIG. 3 is a schematic view of a vehicle panel including an example fiber optic sensor pattern.

Referring to FIG. 3 with continued reference to FIGS. 1 and 2, a sensing pattern 52 of the optic fiber 22 is shown for one panel 14. The sensing pattern 52 is known and mapped such that once a distance is known for each of the waveforms 40, 42, the location of the distortion 45 on the panel 14 can be determined. In this example, the optic fiber 22 is doubled back on itself along the panel 14 such that a coordinate location of the distortion causing the back reflection can be determined. It should be appreciated, that other patterns could be utilized that accommodated contours of the panel 14 while provided a desired coverage by the optic fiber 22 in order to provide detection of distortions and enable location with a desired accuracy and capability.

Figure 4:
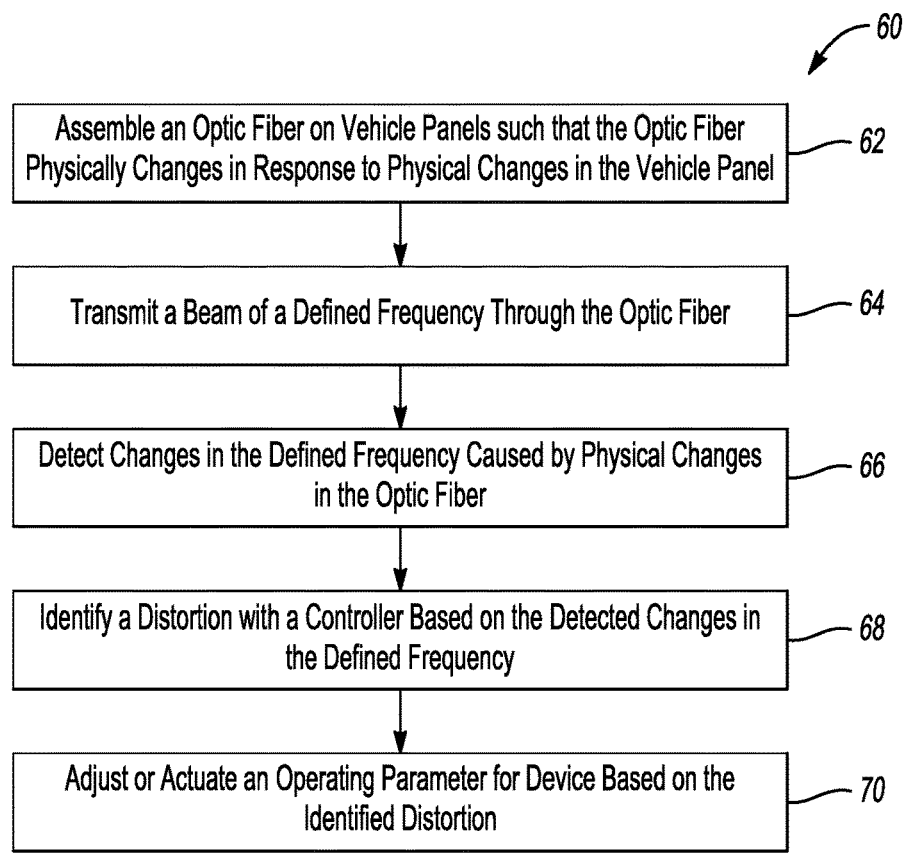
FIG. 4 is a block diagram of a method of detecting and measuring physical changes in a vehicle panel according to an example embodiment.

Referring to FIG. 4 with continued reference to FIGS. 1 and 2, a method sensing a condition of a vehicle body 12 is schematically indicated at 60. The method includes a first step of assembling an optic fiber 22 to a vehicle panel 14 such that the optic fiber 22 will mimic physical changes in the panel 14. The physical changes 14 may include, among other possible things, changes in temperature, stress, strain and distortions caused by collision with another object. A beam 15 is transmitted through the optic fiber 22 at a defined frequency as indicated at 64. Changes in the defined frequency that are caused by physical changes in the optic fiber 22 and panel 14 are detected as indicated at 66. The changes in frequency are identified and measured by a controller 68.

The controller 68 uses statistical and mathematical techniques to identify the distance from the beam generator of the distortion causing the changes to the defined frequency. Once the location and severity of the changes in frequency are understood, the controller 20 can command actuation of one or several vehicle systems 54, 56 in response to the detected distortion. As appreciated, the system actuation can include simple adjustments due to changes in temperature to actuation of safety system in response to a signal indicative of an impact.

Accordingly, the example sensor system 16 provides for the detection of distortions, stress, strains and other physical conditions of a vehicle body with an optic fiber 22 instead of multiple sensors from multiple systems. Moreover, the example sensor system 16 simplifies the detection and measurement of distortions by eliminating redundant sensors and wiring.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle sensing system comprising:
    an optic fiber disposed adjacent to a vehicle panel of a vehicle body;
    a transmitter/receiver disposed at an originating end of the optic fiber, the transmitter/receiver configured to emit a beam through the optic fiber at a defined originating frequency and receive a reflection of the beam through the optic fiber;
    a reflector disposed at a terminal end of the optic fiber configured to receive the beam emitted by the transmitter/receiver through the optic fiber and reflect back the reflection of the beam through the optic fiber to the transmitter/receiver; and
    a controller in communication with the transmitter/receiver, the controller configured to:
        determine a difference between the originating frequency of the beam emitted from the transmitter/receiver and a reflected frequency of the reflection of the beam reflected back from the reflector to the transmitter/receiver, and
        identify a position of a distortion in the vehicle panel based on the difference between the originating frequency of the beam emitted from the transmitter/receiver and the reflected frequency of the reflection of the beam reflected back from the reflector to the transmitter/receiver.

2. The vehicle sensing system as recited in claim 1, wherein the controller is configured to receiver from the transmitter/receiver information relating to the difference between the originating frequency of the beam emitted from the transmitter/receiver and a reflected frequency of the reflection of the beam reflected back from the reflector to the transmitter/receiver.

3. The vehicle sensing system as recited in claim 1, wherein the controller is configured to determine a change in temperature of the vehicle panel based on the difference between the originating frequency of the beam emitted from the transmitter/receiver and the reflected frequency of the reflection of the beam reflected back from the reflector to the transmitter/receiver.

4. The vehicle sensing system as recited in claim 1, wherein the controller is configured to identify the position of the distortion in the vehicle panel by determining a distance from the transmitter/receiver within optic fiber of the distortion in the optic fiber based on the difference between the originating frequency of the beam emitted from the transmitter/receiver and the reflected frequency of the reflection of the beam reflected back from the reflector to the transmitter/receiver.

5. The vehicle sensing system as recited in claim 1, wherein the transmitter/receiver comprises a coherent optical frequency domain reflectometry.

6. The vehicle sensing system as recited in claim 5, wherein the optic fiber includes a sensing fiber arm adjacent to the vehicle panel of the vehicle body and a reference fiber arm disposed on the vehicle such that physical changes to the vehicle panel do not alter shape or length of the reference fiber arm.

7. The vehicle sensing system as recited in claim 6, wherein the originating frequency of the beam emitted from the transmitter/receiver is provided in the reference fiber arm.

8. A method of identifying a distortion of a vehicle panel, the method comprising:
    emitting a beam of an originating frequency through an optic fiber disposed adjacent to the vehicle panel;
    detecting a difference between the originating frequency of the beam and a reflected frequency of a reflection of the beam received through the optic fiber; and
    identifying a position of a distortion in the vehicle panel based on the difference between the originating frequency of the beam and the reflected frequency of the reflection of the beam received through the optic fiber.

9. The method as recited in claim 8, further comprising determining a change in temperature of the vehicle panel based on the difference between the originating frequency of the beam and the reflected frequency of the reflection of the beam through the optic fiber.

10. The method as recited in claim 8, wherein identifying the position of the distortion in the vehicle panel comprises determining a distance from a transmitter/receiver that emits the beam within optic fiber of the distortion in the optic fiber based on the difference between the originating frequency of the beam emitted from the transmitter/receiver and the reflected frequency of the reflection of the beam reflected back from a reflector to the transmitter/receiver.

* * * * *